(12) United States Patent
Walthert et al.

(10) Patent No.: US 11,471,732 B2
(45) Date of Patent: Oct. 18, 2022

(54) METHOD FOR THE ACQUISITION AND EVALUATION OF SENSOR DATA AND TWO-WHEEL COMPONENT

(71) Applicant: DT SWISS INC., Grand Junction, CO (US)

(72) Inventors: Martin Walthert, Aarberg (CH); Simon Hugentobler, Liebefeld (CH); Jean-Paul Victor Ballard, Thalwil (CH); Seamus Mullarkey, Tann (CH); Jonas Gretar Jonasson, Thalwil (CH)

(73) Assignee: DT SWISS INC., Grand Junction, CO (US)

( * ) Notice: Subject to any disclaimer, the term of this patent is extended or adjusted under 35 U.S.C. 154(b) by 434 days.

(21) Appl. No.: 16/785,311

(22) Filed: Feb. 7, 2020

(65) Prior Publication Data
US 2020/0254308 A1    Aug. 13, 2020

(30) Foreign Application Priority Data

Feb. 9, 2019  (DE) .......................... 102019103229.6

(51) Int. Cl.
*A63B 24/00* (2006.01)
*A63B 21/00* (2006.01)
(Continued)

(52) U.S. Cl.
CPC ...... *A63B 24/0062* (2013.01); *A63B 21/4049* (2015.10); *A63B 22/0605* (2013.01);
(Continued)

(58) Field of Classification Search
CPC .. A63B 24/0062; B62J 45/40; G01L 19/0092; G01L 27/002; G01P 5/00
See application file for complete search history.

(56) References Cited

U.S. PATENT DOCUMENTS

| | | | |
|---|---|---|---|
| 5,497,143 A | 3/1996 | Matsuo et al. | |
| 6,735,542 B1 | 5/2004 | Burgett et al. | |

(Continued)

FOREIGN PATENT DOCUMENTS

| | | |
|---|---|---|
| DE | 19619899 A1 | 11/1997 |
| EP | 2583887 A1 | 4/2013 |

(Continued)

OTHER PUBLICATIONS

European Search Report received for European Application No. 20156225.3 dated Jun. 9, 2020, 7 pages.

(Continued)

*Primary Examiner* — Francis C Gray
(74) *Attorney, Agent, or Firm* — Greer, Burns & Crain, Ltd

(57) ABSTRACT

A method for capturing and evaluating sensor data while riding a bicycle on a path and a bicycle component, including at least one barometric pressure sensor for capturing an air pressure signal for the ambient pressure on the bicycle during the ride, at least one stagnation pressure sensor for determining at least one stagnation pressure value on the bicycle during the ride, and a computer which is configured and set up to derive on the bicycle during the ride from the air pressure signal, a corrected ambient pressure value for the ambient pressure, taking into account the obtained stagnation pressure value.

25 Claims, 5 Drawing Sheets

(51) Int. Cl.
  *A63B 22/06* (2006.01)
  *B62J 45/40* (2020.01)
  *G01L 19/00* (2006.01)
  *G01P 5/00* (2006.01)

(52) U.S. Cl.
  CPC .......... *B62J 45/40* (2020.02); *G01L 19/0092* (2013.01); *G01P 5/00* (2013.01); *A63B 2220/80* (2013.01)

(56) References Cited

U.S. PATENT DOCUMENTS

| | | |
|---|---|---|
| 2007/0068273 A1 | 3/2007 | Cunningham |
| 2012/0192622 A1* | 8/2012 | Lane .................... G01C 21/005 73/488 |
| 2012/0221257 A1* | 8/2012 | Froncioni ............... G01M 9/08 702/45 |
| 2013/0194066 A1* | 8/2013 | Rahman .................. G05B 1/01 340/5.51 |
| 2014/0278229 A1* | 9/2014 | Hong ................. A61B 5/02433 702/160 |
| 2016/0084869 A1* | 3/2016 | Yuen .................... A63B 21/072 73/510 |
| 2017/0021884 A1* | 1/2017 | Ebel ..................... G02B 6/0006 |
| 2017/0361891 A1* | 12/2017 | Crowell .................. B62J 45/40 |
| 2018/0193698 A1 | 7/2018 | Case, Jr. et al. |

FOREIGN PATENT DOCUMENTS

| | | | |
|---|---|---|---|
| GB | 2568885 A * | 6/2019 | .............. B62J 99/00 |
| JP | 2013-095306 A | 5/2013 | |
| JP | 2018-044814 A | 3/2018 | |
| WO | 2005/054872 A1 | 6/2005 | |
| WO | 2018/184092 A1 | 10/2018 | |

OTHER PUBLICATIONS

German Search Report received for German Application No. 10 2019 103 229.6 dated May 27, 2019, 8 pages.

* cited by examiner

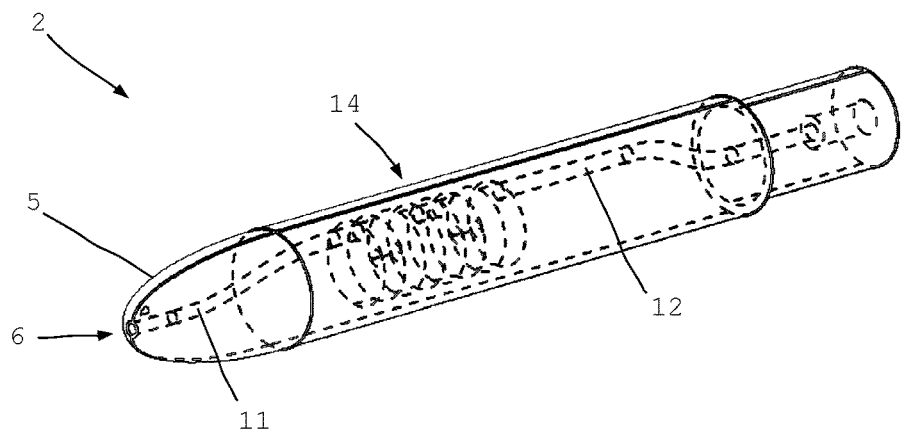
Fig. 6
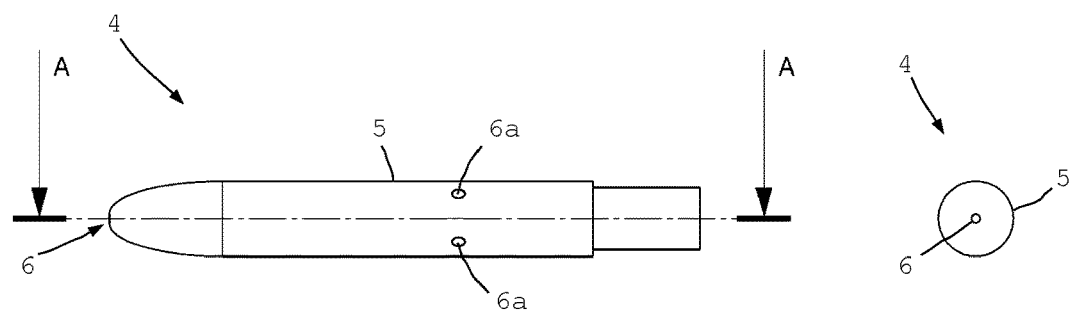
Fig. 7
Fig. 8
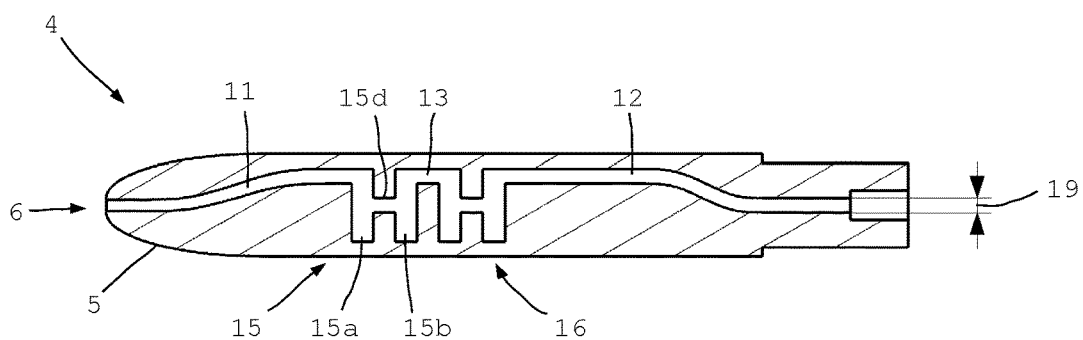
Fig. 9

METHOD FOR THE ACQUISITION AND EVALUATION OF SENSOR DATA AND TWO-WHEEL COMPONENT

BACKGROUND

The present invention relates to a two-wheeled vehicle component or bicycle component and a method of capturing and evaluating sensor data respectively data captured by sensors while operating an at least partially muscle-powered two-wheeled vehicle on a path and in particular a street or road. Although the invention will now be described in respect of use with an at least partially muscle-powered bicycle, the method may also be used with solely muscle-powered or partially or entirely electrically operated bicycles.

The present invention may in particular be used in a system for measuring the aerodynamic drag coefficient (CdA) of a bicycle with a rider. Obtaining the aerodynamic drag coefficient for example of a bicycle with a rider requires a number of measurement values. It is for example significant to know the value of a current gradient.

These days for example, the elevation position of bicycles tends to be obtained by means of a barometric pressure sensor. Alternately it is possible to capture an elevation position via a satellite system such as GPS or another satellite navigation system. A satellite system provides high accuracy of elevation determination. Several subsequent measurements allow to derive a gradient. The drawback thereof is that the elevation position shows at a relatively low resolution. This leads to very high inexactness when obtaining for example the gradient of a mountain or a hill. The result suffices for viewing during or following a tour but it does not for obtaining an aerodynamic drag coefficient of a useful quality.

Another option of determining the elevation or change in elevation is to use a barometric pressure sensor to derive a (relative) elevation from the air pressure signal. Barometric pressure sensors operate with a high resolution considerably better than that of satellite systems. A drawback of using barometric pressure sensors for capturing the ambient air pressure is that the measurement result is distorted in moving objects. For example, if the barometric pressure sensor is oriented to the front face of the bicycle, it is not the ambient pressure that is captured but the total pressure which considerably differs from the static air pressure. If the barometric pressure sensor for capturing the ambient pressure is disposed on one side of the two-wheeled vehicle component, then the measurement result may be distorted according to Bernoulli's theorem. Although the error may be reduced by disposing the absolute pressure transducer in a housing interior, considerable distortions may still occur. These temporary distortions do not tend to be bothersome for normal viewing after a tour. It is different, however, if more precise measurement results are desired or required for example for obtaining an aerodynamic drag coefficient.

It is therefore the object of the present invention to provide a method of capturing and evaluating sensor data and a two-wheeled vehicle component with which to achieve improved accuracy.

SUMMARY

While a particular embodiment of the present method of capturing and evaluating sensor data and bicycle component has been described herein, it will be appreciated by those skilled in the art that changes and modifications may be made thereto without departing from the invention in its broader aspects and as set forth in the following claims.

A method according to the invention of capturing and in particular evaluating sensor data or data captured by sensors while riding a bicycle that is in particular at least partially muscle-powered on a path and in particular a street or road is carried out employing at least two sensors. The following steps are carried out in this or another useful sequence:

Capturing an air pressure signal for the ambient pressure by means of at least one barometric pressure sensor on the bicycle during the ride;

Detecting or capturing a stagnation pressure value by means of at least one stagnation pressure sensor system on the bicycle during the ride;

Deriving a corrected ambient pressure value taking into account the obtained stagnation pressure value in particular on the bicycle during the ride.

Another method according to the invention of capturing and in particular evaluating sensor data or data captured by sensors while riding a bicycle that is in particular at least partially muscle-powered on a path and in particular a street or road is carried out employing at least two sensors. The following steps are carried out in this or another useful sequence:

Capturing an air pressure signal for the ambient pressure by means of at least one barometric pressure sensor on the bicycle during the ride;

Obtaining a measure of the relative air speed relative to the bicycle on the bicycle during the ride;

Deriving a corrected ambient pressure value taking into account the relative speed in particular on the bicycle during the ride.

This includes in particular, obtaining a stagnation pressure value by means of at least one stagnation pressure sensor system on the bicycle during the ride to determine a measure of the relative air speed.

The relative air speed between the sensor and the ambience may also be captured by other measuring means. For example, by anemometers or a method using a hot wire or by laser measuring methods or in particular also by LDA methods.

Preferably the stagnation pressure sensor system includes a differential pressure sensor by means of which a pressure difference between the total pressure and a local static pressure is captured in particular locally at the stagnation pressure sensor system from which a stagnation pressure value is derived or directly captured.

Alternatively or additionally, the stagnation pressure sensor system may include for example a total pressure sensor as a barometric pressure sensor. The measurement value of the total pressure sensor allows to obtain a stagnation pressure value taking into account the ambient pressure captured with the barometric pressure sensor. The total pressure sensor of the stagnation pressure sensor system preferably captures the total pressure acting in the traveling direction (static pressure plus dynamic pressure).

It is also possible and preferred for the stagnation pressure sensor system to show for example a total pressure sensor (static pressure plus dynamic pressure) and a (its own) dedicated (or separate) pressure sensor for capturing a measurement value of the local static pressure. One or more measurement values of the total pressure sensor and one or more measurement values of the local static pressure also allow to obtain or derive a stagnation pressure value.

The total pressure is composed of the pressure prevailing in the ambience (ambient pressure) and the stagnation pressure built up by the relative air speed. The stagnation pressure is the dynamic pressure caused by the travel and the relative air speed. The local static pressure is understood to mean the local ambient pressure acting on the pertaining sensor.

The stagnation pressure sensor system may comprise a stagnation pressure sensor in the shape of a pitot tube system.

The method according to the invention has many advantages. A considerable advantage of the method according to the invention consists in using, for correcting the ambient pressure, the stagnation pressure value captured by a stagnation pressure sensor system.

The stagnation pressure value obtained or captured by a stagnation pressure sensor system depends on the relative speed of the air relative to the bicycle. As a rule, this relative speed also influences the measurement result of the barometric pressure sensor for the ambient pressure. This is why the stagnation pressure value is advantageously suitable to correct the air pressure signal and derive a corrected ambient pressure value.

The invention enables simple ways and means of considerably improving measurement results in moving objects. This is in particular decisive for precisely capturing elevation values and elevation differences during bicycle rides. A sufficiently precise determination of an aerodynamic drag coefficient is thus enabled as well.

Unlike determining an aerodynamic drag coefficient in motor vehicles, precise measurements are important in particular for bicycles. Their driving power varies over a range of several kilowatts or even hundred kilowatts. In bicycles, the driving power varies in ranges of several hundred watts and thus in magnitudes smaller than in motor vehicles. In order to obtain informative values, it makes sense to precisely measure the parameters involved. The invention allows a considerably more precise determination of gradients so as to allow to determine a significant parameter with increased accuracy when determining the aerodynamic drag coefficient.

The invention is used in particular with at least partially or entirely muscle-powered two-wheeled vehicles and in particular bicycles. Therefore, the term two-wheeled vehicle component may be continuously replaced by the term bicycle component. Its use is possible and preferably provided in particular with so-called "Light Electric Vehicles" (LEV), meaning electric vehicles having two or four wheels driven by a battery, fuel cell or hybrid drive, generally weighing less than 100 kg and preferably less than 80 kg and particularly preferably less than 50 kg or 30 kg. Particularly preferably, the invention is used for use in open-top two-wheeled vehicles or bicycles. These are roof-less, two-wheeled vehicles.

In preferred specific embodiments, an aerodynamic yaw angle value or yaw angle is captured by at least one yaw sensor. Obtaining a yaw angle value and thus the wind direction relative to the bicycle allows a still further improved determination of a current air pressure signal. The yaw angle is understood to mean the angle at which a rider feels the wind blast. This is the angle resulting from the traveling speed of the bicycle and the wind speed and wind direction. For example, if a bicycle rider rides through a curve in a continuous headwind, then the relative wind speed changes during cornering and so does the wind direction relative to the traveling direction. Continuously capturing a yaw angle value and capturing a stagnation pressure value with the stagnation pressure sensor system thus allows to obtain data, enabling a considerably improved accuracy in determining the absolute ambient pressure.

Preferably, a corrected ambient pressure value is derived taking into account the aerodynamic yaw angle value. The yaw angle allows to also capture and take into account the influence of the wind angle relative to the housing of the bicycle component. For example, if the barometric pressure sensor is disposed in the interior of the housing of the bicycle component for capturing the static pressure and has an opening toward a side surface of the housing, then the wind direction will have considerable impact on the captured air pressure signal. Thus, lateral winds from one and the other sides will show quite different results, and so will tailwinds or headwinds. These influences can thus be corrected.

A corrected ambient pressure value is preferably derived periodically, taking into account the stagnation pressure value and/or the yaw angle. The corrected ambient pressure is preferably derived during riding on a regular basis. The capturing time intervals may be identical or different and may depend on the preceding measurement values. The measuring frequency is preferably increased if variations of the measurement values increase. The measuring frequency can preferably be decreased if variations of the measurement values decrease. A minimum frequency is preferably maintained.

The traveling speed of the bicycle is preferably obtained and taken into account. A rolling resistance is preferably estimated or computed or measured. Weight data of the rider and/or of the bicycle can be input, transmitted or captured or measured.

It is likewise preferred to obtain and take into account an angle of ascent.

A relative wind direction and/or relative wind speed is preferably obtained from the captured data. It is also possible to obtain an absolute wind direction and wind speed In a preferred configuration an air pressure signal for the ambient pressure is obtained by means of a barometric pressure sensor or an absolute pressure transducer. Furthermore, a stagnation pressure value is preferably captured by at least one stagnation pressure sensor system or pitot tube system. In simple configurations, the stagnation pressure sensor system comprises (at least) one pitot tube system to capture the stagnation pressure (in the traveling direction).

Preferably, the stagnation pressure sensor system comprises (at least) one differential pressure sensor or two absolute pressure transducers by means of which a differential pressure is obtained. The differential pressure sensor in particular comprises a pitot tube with an opening at the front end and at least one other opening disposed in particular laterally. The differential pressure between the total pressure at the front end and the (local) static pressure at the lateral opening preferably serves to obtain a stagnation pressure value. A number of lateral openings are in particular distributed over the circumference. Preferably the lateral openings are interlinked so that a mean pressure is effective.

It is also possible for the stagnation pressure sensor system to not comprise a differential pressure sensor. Then for example, a value of the stagnation pressure is captured by a total pressure sensor and the stagnation pressure value is derived taking into account the air pressure signal for the ambient pressure measured by a barometric pressure sensor or absolute pressure transducer. The barometric pressure sensor or absolute pressure transducer is preferably disposed the closest possible to the total pressure measuring point.

As a rule, it is easier, more cost-effective and more precise to capture the stagnation pressure value by means of a differential pressure sensor.

In all the configurations, a corrected ambient pressure value is preferably derived by using calibration data. The calibration data may be stored in a calibrating matrix and/or in a computer memory device. The calibration data are particularly preferably derived from tests in a wind tunnel or for example from road tests at constant conditions with no (or defined) variations in elevation in a pre-defined range of air speeds and yaw angles.

In a preferred specific embodiment, the following steps are furthermore carried out in this or another useful sequence:
Deriving a current measure of elevation from the current, characteristic air pressure signal for the ambient pressure (for the current elevation of the bicycle);
Deriving at least one current elevation signal by capturing data from a satellite system or global navigation satellite system (GNSS) (in particular for the current elevation of the bicycle);
Computing a current elevation value from the current air pressure signal, taking into account the current elevation signal (for the current elevation of the bicycle).

This specific embodiment furthermore employs an elevation signal from at least one satellite system for corrections. This is particularly useful and/or is carried out in particular when for example due to changes in the weather or the like an increasing divergence shows of the elevation value obtained with the barometric pressure sensors from the elevation signal from the satellite system. Particularly preferably, known elevation data may (also) be input (also) in (known) positions. For example, at home or on the beach or in marked or known points such as on mountain passes.

Although the frequencies at which a current measure of elevation is captured from a current, characteristic air pressure signal for an ambient pressure and a current elevation signal, by capturing data from a satellite system, may be identical, they are preferably different.

In particular, at least one measuring frequency for capturing signals with a control device is set variable and in particular in dependence on at least one current riding condition.

Preferably, a change of elevation is derived from the current air pressure signal and a reference signal of the air pressure. A reference signal of the air pressure may for example be obtained or input at the start of a ride. It is also possible to obtain reference signals periodically.

Preferably, a reference signal is corrected if the current elevation value obtained in particular from the current air pressure signal differs from the current elevation signal by a predetermined amount. The reference signal may for example be corrected if the difference between the current elevation value and the current elevation signal is larger than the elevation resolution of the satellite system over a number of measurements.

In preferred specific embodiments, at least one aerodynamic drag coefficient is derived. Then the aerodynamic drag coefficient is valid for the bicycle and any rider sitting thereon including the equipment used.

A bicycle component according to the invention is provided for an at least partially muscle-powered bicycle and comprises at least one barometric pressure sensor for capturing at least one air pressure signal for an ambient pressure during the ride and at least one stagnation pressure sensor system (in particular a pitot tube system) for obtaining or capturing or deriving at least one stagnation pressure value during the ride and/or at least one sensor system for obtaining a measure of a relative speed of the air during the ride and a computer that is configured and set up to derive or compute during the ride from the air pressure signal a corrected ambient pressure value for the ambient pressure taking into account the captured or derived stagnation pressure value and/or taking into account the relative speed of the air.

The computer comprises in particular a memory device or a memory and at least one data interface. For example, calibration data may be stored in the memory device. Calibration data may be requested and/or transmitted through the data interface.

Preferably, the bicycle component comprises at least one yaw sensor system for capturing at least one aerodynamic yaw angle value. The term "yaw angle" is presently always understood to mean the aerodynamic yaw angle.

In preferred configurations, the computer is configured and set up to compute a corrected ambient pressure value taking into account the aerodynamic yaw angle value. This is advantageous since the wind direction relative to the bicycle can be taken into account as well.

The stagnation pressure sensor system preferably comprises a pitot tube system and in particular at least one total pressure tube. The total pressure tube preferably has an opening (oriented forwardly in operation). It is possible to connect an absolute pressure transducer therewith. Preferably, the total pressure tube also has at least one and in particular a number of lateral openings and thus it constitutes a pitot tube. Then, a differential pressure sensor may capture a stagnation pressure value which is characteristic of the air speed from in front (in particular frontal).

The stagnation pressure value so obtained serves to derive a corrected ambient pressure value. Capturing the corrected ambient pressure value is considerably more precise with this method since dynamic influences are discounted. In preferred configurations, the ambient pressure value measured with an absolute pressure transducer (e.g. in the housing interior) is corrected by way of a relative air speed and/or a stagnation pressure value.

Preferably, the bicycle component comprises at least two differently oriented surfaces which are oriented at angles relative to one another wherein each is connected with a pressure sensor. For example, the surfaces may be oriented approximately perpendicular to the ground. These surfaces are oriented at an angle relative to one another. The angle is preferably less than 150° or less than 120° or less than 90°. It is possible to obtain a pressure by means of the two surfaces and then to derive a yaw angle value from the two pressures. It is also possible and particularly preferred to capture a pressure difference by way of two surfaces oriented at angles to one another and to compute a yaw angle value therefrom. It is also possible to configure a yaw angle probe with two surfaces angled to one another and with openings so as to derive a yaw angle value e.g. from a differential pressure sensor or from the difference between two absolute pressure transducers.

Preferably, the sensors are fixedly connected with the bicycle component frame. The connection may be indirect or direct. This means that the orientation of the sensors does not change along with the steering angle.

It is also possible to directionally attach or dispose all the sensors e.g. to the handlebar or the fork of the bicycle component.

In preferred specific embodiments the bicycle component comprises a frame and/or a fork and/or at least one front wheel and/or at least one rear wheel.

The bicycle component comprises in particular, an energy source such as a battery. Particularly preferably the bicycle component comprises a display and/or an interface with a display.

It is possible and preferred, that at least one speed sensor for capturing the traveling speed and/or at least one power sensor is comprised. At least one speed sensor may for example be disposed on one of the wheels. A power sensor may for example be disposed in the bottom bracket or on the pedals or the pedal cranks or the rear wheel hub which may be comprised.

In a memory device, captured measurement values and/or at least the corrected ambient pressure values and/or calibration data may be stored.

Preferably, the bicycle component further comprises at least one satellite sensor for capturing a current elevation signal. Thus, the elevation value may be calibrated at irregular or regular intervals.

Furthermore, it is possible for at least one humidity sensor to be comprised. In particular, at least one temperature sensor may also be comprised. A humidity sensor and/or a temperature sensor may for example obtain the air density. In the sense of the present application a humidity sensor is also understood to include a moisture sensor or a hygrometer. A humidity sensor may include a temperature sensor to capture a measure for the air humidity, for example if the air humidity is obtained by the dew point method.

The invention allows an advantageous way of capturing improved data when riding a bicycle. This allows to obtain aerodynamic drag coefficients of the bicycle and the rider including different seated positions and seated postures. The rider may include in measuring and evaluating his equipment such as helmet, suit, clothing etc. Thus the rider may find out what for him is the optimal combination of bicycle parts and equipment and determine what for him is the best helmet in terms of aerodynamics offering the lowest air drag in his preferred position.

Obtaining changes of elevation during riding may be considerably improved since the air pressure signals of the barometric pressure sensor can be corrected for capturing the absolute ambient pressure by way of the stagnation pressure values captured simultaneously or with minimal time offset. The wind direction respectively the yaw angle may be taken into account as well.

The air drag is a significant force against which the bicycle rider must work. A higher air drag makes the bicycle rider employ more energy to maintain or even increase his speed. This is particularly important with racing bicycles in racing conditions. Then the bicycle riders must keep up their energy over long distances. Bicycle races may be won or lost due to a few seconds.

Reducing aerodynamic drag is also important for reasons of energy efficiency. This is also important for partially or entirely driven electric bicycles where a lower aerodynamic drag allows higher speeds and/or extended operational range and/or reduced battery size. Therefore, deriving an aerodynamic drag coefficient is very advantageous for improving the competitiveness and efficiency of a bicycle rider and his equipment.

Measuring the aerodynamic drag coefficient is highly dependent on the sensor data and particularly on the current gradient value.

The present invention allows to compute the current gradient value and gradient angle from changes of elevation with high accuracy. Change of elevation in turn is determined by changes of the ambient pressure captured by barometric pressure sensors.

The barometric pressure sensor for capturing the absolute ambient pressure measures a static air pressure. The measuring accuracy of the absolute ambient pressure depends per se on the position of the barometric pressure sensor on the bicycle component (and also its positioning on the bicycle). Taking into account the stagnation pressure value allows corrections to the air pressure signal of the ambient pressure sensors so as to obtain a correct value even if the measurement per se is influenced by the wind blast.

The correction of the air pressure signal of the ambient pressure sensor depends on the air speed (stagnation pressure value), the angle of air movement (yaw angle) and the position of the barometric pressure sensor on or in the bicycle component. Pertaining calibration data and pertaining measurements allow to considerably improve the accuracy of measuring changes of elevation.

A two-wheeled vehicle and in particular a bicycle in the sense of the present invention preferably comprises two wheels on two different axles. In particular, in use as intended the two wheels are disposed (at least substantially or entirely) in tandem.

The method according to the invention is not limited to use with an at least partially muscle-powered bicycle. The bicycle component according to the invention may be used with products other than bicycles.

BRIEF DESCRIPTION OF THE DRAWINGS

Further advantages and features can be taken from the exemplary embodiments which will be discussed below with reference to the enclosed figures.

The figures show in:

FIG. 6 a perspective illustration of a measuring probe of a bicycle component;

FIG. 7 the measuring probe according to FIG. 6 in a side view;

FIG. 8 a front view of FIG. 6;

FIG. 9 a section of FIG. 6;

DETAILED DESCRIPTION

Figure 1:
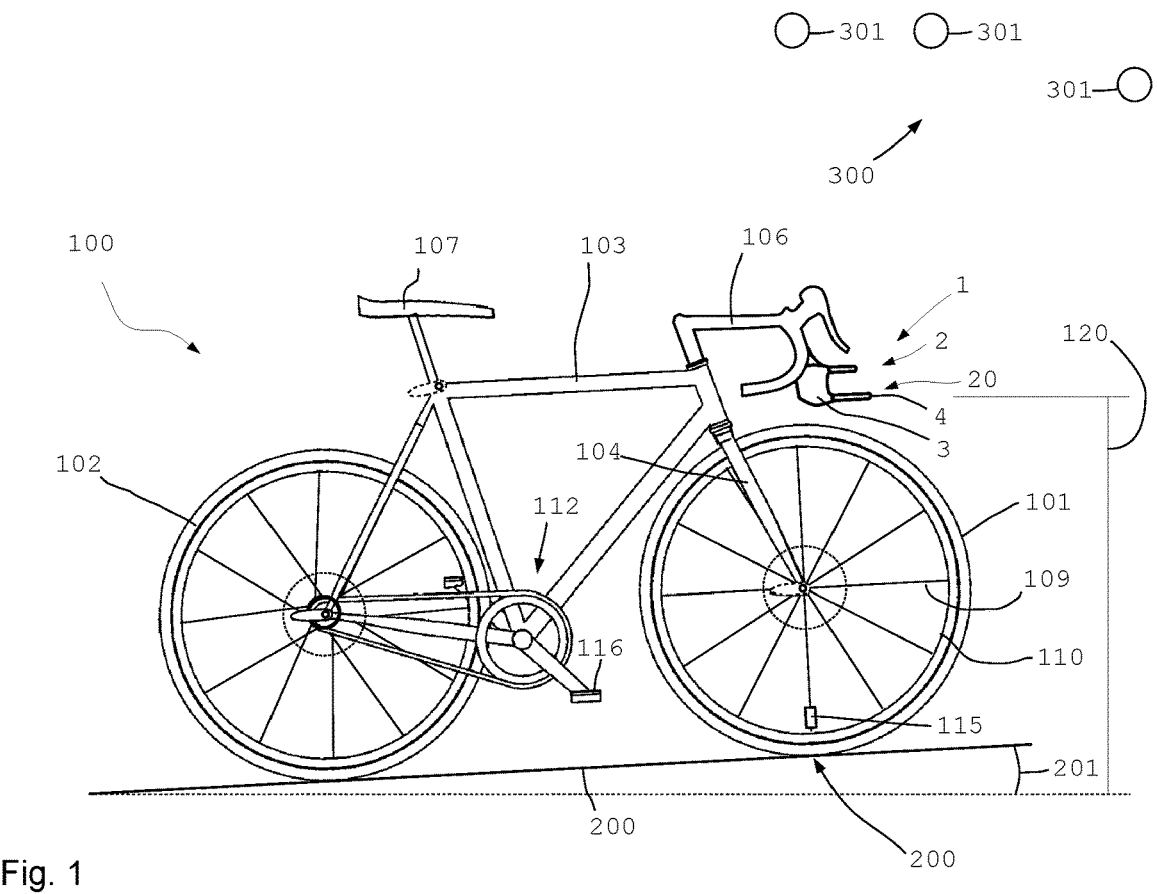
FIG. 1 a schematic side view of a racing bicycle on an ascending road including a bicycle component according to the invention.

FIG. 1 illustrates a racing bicycle 100 wherein the invention may also be used in a mountainbike. The racing bicycle 100 comprises a front wheel 101 and a rear wheel 102. The two wheels 101, 102 are provided with spokes 109 and a rim 110. Conventional caliper brakes or other brakes such as disk brakes may be provided.

A bicycle 100 comprises a frame 103, a handlebar 106, a saddle 107 and a fork. A pedal crank 112 with pedals serves for driving. Optionally the pedal crank 112 and/or the wheels may be provided with an electrical auxiliary drive. The hubs of the wheels may be fastened to the frame e.g. by means of a through axle or a quick release.

The racing bicycle 100 illustrated in FIG. 1 travels uphill on a path or street 200. The gradient angle 201 indicates the present gradient. One or more speed sensors 115 serve to obtain the traveling speed of the racing bicycle 100 on the path 200. The speed may be obtained by way of spoke sensors or in the wheel itself and/or through satellite systems. Power or force sensors 116 at the pedals and/or pertaining sensors at the pedal crank and/or at the rear wheel hub serve to compute the driving power of the racing bicycle 100.

The bicycle component 1 with the measuring device 2 is directionally fastened to the handlebar 106 and/or the fork. The captured data can be evaluated, stored and processed in the bicycle component 1 or the measuring device 2 of the bicycle component 1 or in a separate (bicycle) computer.

The bicycle component 1 comprises a measuring device 2 and a housing 3 where one or more measuring probes 4 are disposed. The measuring probe 4 may be configured as a pitot tube and may capture a measure of the stagnation pressure at the front end of the measuring probe 4 or the probe body 5. An internal air guide allows to feed the total pressure to a barometric pressure sensor where it is captured. Taking into account the ambient pressure allows to derive the stagnation pressure. Preferably, a differential pressure sensor is used for capturing a pressure difference between the total pressure at the front end and a lateral, local static pressure (local ambient pressure) on the measuring probe 4. It is also possible to use two absolute pressure transducers and to obtain their difference for computing the stagnation pressure.

Figure 2:
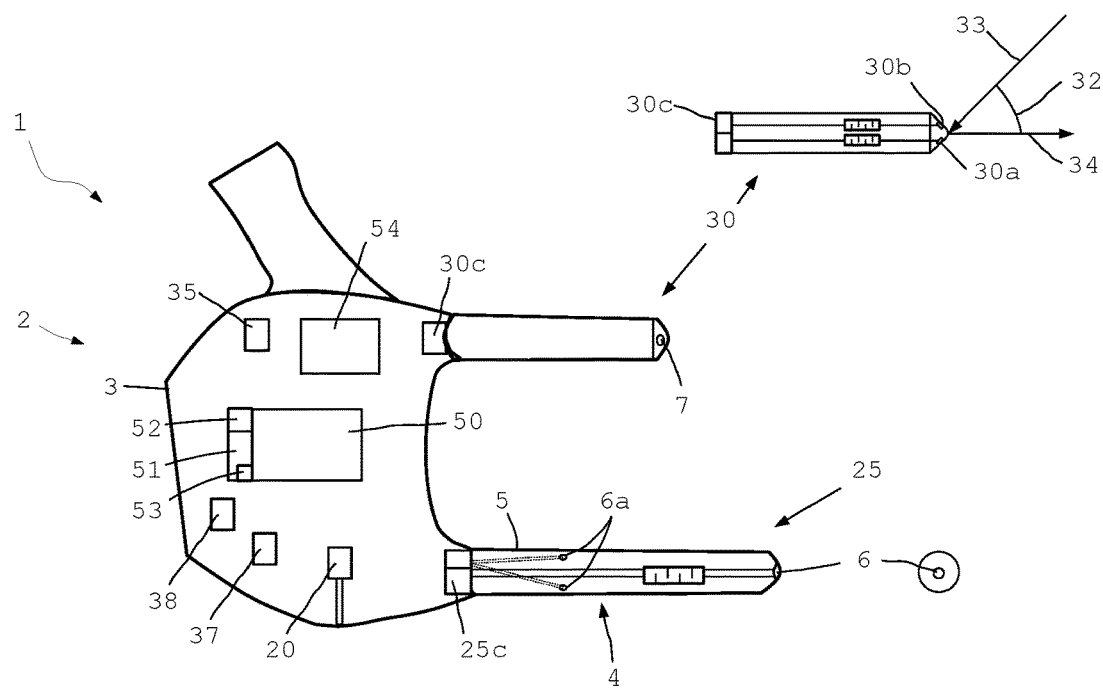
FIG. 2 a bicycle component in a schematic side view.

FIG. 2 shows an enlarged illustration of the bicycle component 1 from FIG. 1 and schematically shows several components or parts of the bicycle component 1. The bicycle component 1 comprises a measuring device 2. The measuring probe 4 with the probe body 5 is disposed at the front end of the bicycle component 1 viewed in the traveling direction, to capture the stagnation pressure at the front end of the bicycle component 1 and thus near the front end of the bicycle 100. Positioning in the front region substantially avoids possible influences by further components of the racing bicycle 100.

At its front end, the probe body 5 shows the outwardly opening 6. Through an air guide 10, which will be discussed in detail below, in the interior of the probe body 5, the opening 6 is connected with the schematically illustrated stagnation pressure sensor system 25. A front view is schematically illustrated on the right next to the bicycle component proper. The round probe body 5 with the central front opening 6 is identifiable.

The probe body 5 of the measuring probe 4 is elongated in shape and approximately cylindrical over a substantial part of its length. At least one hole 6a is configured spaced apart from the front end and presently in an approximately central section on the circumference. This hole 6a is connected with the stagnation pressure sensor system 25 on the side wall of the probe body 5. The central front opening 6 is likewise connected with the stagnation pressure sensor system 25.

The stagnation pressure sensor system 25 comprises a differential pressure sensor 25c, which captures a differential pressure between the openings 6 and 6a. Thus, a dynamic differential pressure is captured from which a stagnation pressure value or air pressure value is derived. A value for the local static pressure is captured via the openings 6a while the total pressure during the ride is captured through the opening 6. The differential pressure obtained with the differential pressure sensor 25c of the stagnation pressure sensor system 25 is a measure for the relative air speed streaming frontally onto the probe body.

A number of openings 6a are preferably evenly distributed over the circumference and interconnected inside the probe body 5 so that they capture an average static pressure. FIG. 2 exemplarily shows two openings 6a, each being disposed slightly above and approximately below the center line. The openings 6a may be interconnected in the longitudinal section of the openings 6a or may be connected with the differential pressure sensor 25c through separate ducts. Two or more and in particular three, four, five, six, seven or eight or more openings 6a may be (symmetrically) distributed over the circumference.

In the interior of the probe body 5, the indicated ducts are in particular configured in all the ducts so as to prevent water from penetrating up to the sensor.

The bicycle component 1 furthermore comprises a barometric pressure sensor 20 for capturing the ambient pressure. The barometric pressure sensor 20 for capturing the ambient pressure may be disposed in a number of positions of the measuring device 2. At any rate the barometric pressure sensor 20 should not also capture the total pressure which is captured by the stagnation pressure sensor 25 at the foremost tip of the measuring device 2.

For capturing the ambient pressure, the barometric pressure sensor 20 (also referred to as absolute pressure transducer) may for example be disposed inside the housing 3, specifically in a lower region of the housing 3 or in the rear region of the housing 3. It is also possible for the barometric pressure sensor 20 for capturing the ambient pressure to be disposed on a side surface or at the bottom face of the housing 3 or to include an inlet surface. At any rate the barometric pressure sensor 20 captures an air pressure signal 21 for the ambient pressure but not for some other pressure which might lie between the total pressure and the ambient pressure.

Figure 12:
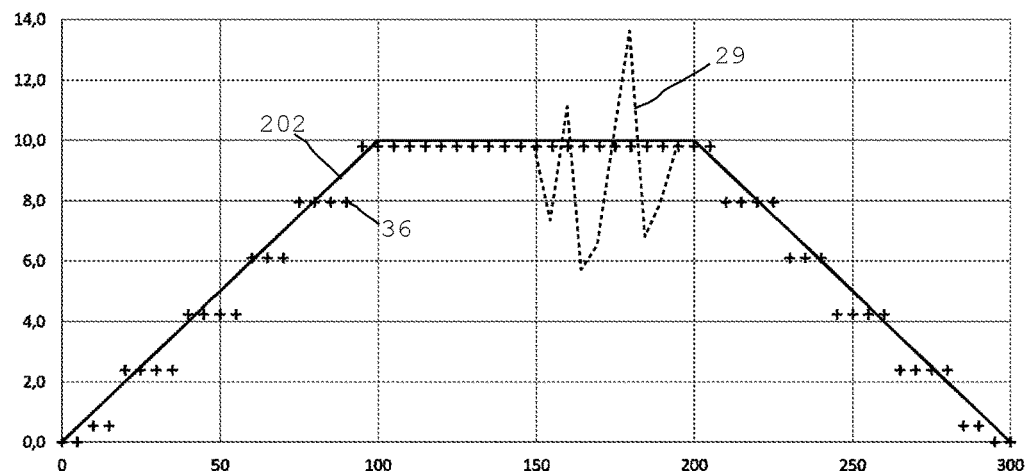
FIGS. 12 to 14 an elevation curve of a road over the track and values measured during riding on said track.

The bicycle component 1 illustrated in FIG. 2 furthermore comprises a satellite sensor 35 with which signals can be received from a satellite system 300 or its satellite 301 (see FIG. 1) to derive an elevation signal 36 in a known manner (FIG. 12). A humidity and/or temperature sensor 37 may be provided for determining the air humidity and/or air temperature, and may also be used for computing the air density of the ambient air. An acceleration sensor 38 serves to capture the accelerations of the racing bicycle 100.

By means of a computer 50 comprising a memory 51 and a data interface and in particular a network interface 52 the captured data may be processed, stored, and optionally transmitted to remote stations. The data interface may also comprise an antenna for receiving and/or emitting signals. Data can thus be optionally radio-transmitted.

The power source 54 may be a battery or an accumulator or another energy storage device to provide the energy required for the sensors, the memory and the computer. Energy supply through the bicycle is also conceivable.

A yaw sensor 30 comprises a differential pressure sensor 30c for capturing the differential pressure at the two openings 30a and 30b disposed at the front end of the yaw angle probe. The yaw angle probe is configured at its front end with two surfaces angled relative to one another (in particular perpendicular to the ground) and presently oriented at an angle of 90° to one another, and comprises the two openings 30a and 30b. A yaw angle 32 is derived from the measurement values.

The yaw sensor comprises a probe body similar to that of the stagnation pressure sensor system 25. Two separate air guides are configured in the interior of the probe body of the yaw sensor 30. The front tip is provided with two openings 30a, 30b at angles relative to one another, in particular connected with a differential pressure sensor 30c or separate pressure sensors to derive a differential pressure.

To facilitate overview, the half of FIG. 2 on the right shows a top view of the probe body of the yaw sensor 30 from which it can be seen that the openings 30a, 30b of the differential pressure sensor 30c are oriented at angles to one another.

Thus, it is possible to obtain from the traveling speed 34 and the captured values, the wind direction and the wind speed 33 relative to the movements of the bicycle 100. Said wind direction and wind speed 33 correspond to the wind blast to which the rider is exposed at the yaw angle 32.

It is also possible to provide two or optionally more surfaces on which to measure the air pressure disposed e.g. at angles to one another to derive a yaw angle 32 from the differences between the measurement values.

Figure 3:
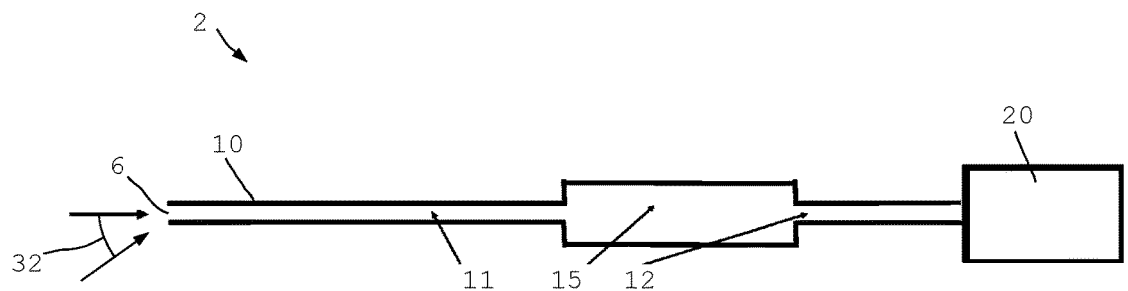
FIG. 3 a sectional diagrammatic drawing of a bicycle component.
Figure 4:
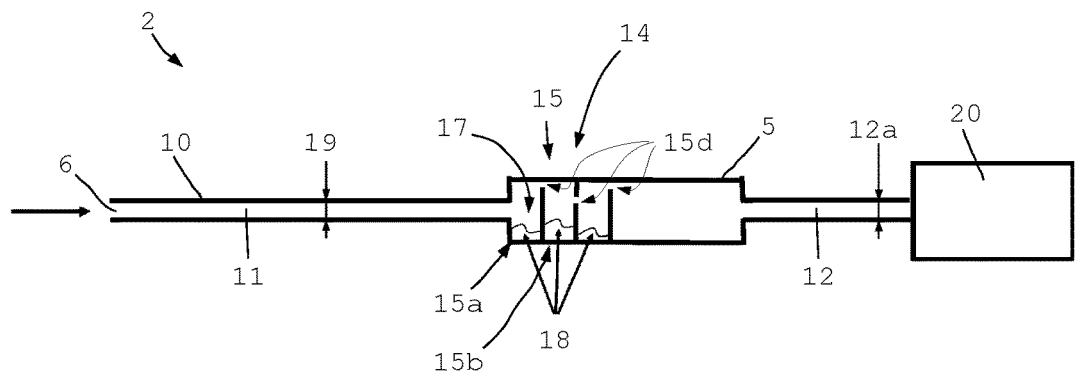
FIG. 4 another sectional diagrammatic drawing of a bicycle component.
Figure 5:
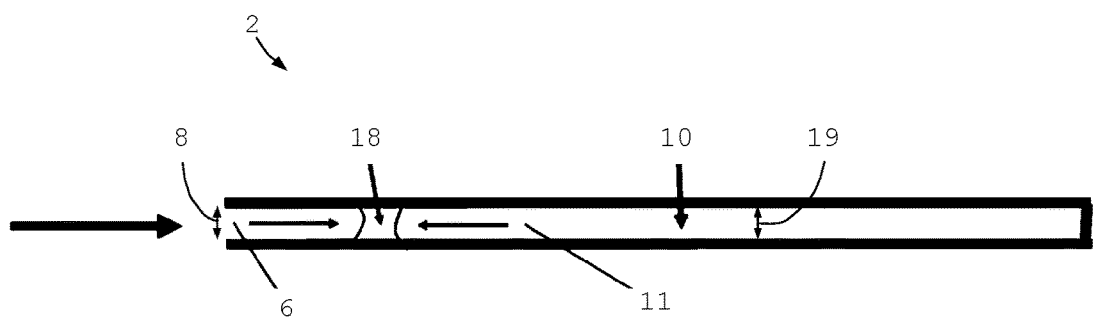
FIG. 5 a schematic detail of a bicycle component.

FIGS. 3 to 5 are schematic illustrations of a bicycle component 1 respectively a measuring device 2 with a measuring probe 4. FIG. 3 shows a simple example of a measuring probe 4 including a graphic illustration of one of the air guides 10.

For the sake of clarity, only one air guide 10 each is shown although the yaw sensor 25 or the stagnation pressure sensor system 30 for capturing the stagnation pressure preferably each comprise differential pressure sensors and two or more separate air guides 10. Various air guides 10 are separate from one another inside of a probe body, comprising separate chambers 15 and/or chamber sections and optionally partition walls 15c to prevent water and/or dirt from entering up to the pressure sensor or differential pressure sensor.

At the front end of the probe body 5, the outwardly opening 6 is formed, which is followed by the air guide 10 and firstly, the air duct 11 as a supply duct. The air duct 11 extends up to the chamber 15 which provides a takeup space for any entered water. In a preferred configuration a typical diameter 19 of the air duct 11 is approximately 1 mm (+/−20%). The narrow diameter already largely prohibits the entry of water.

The rear end of the chamber 15 is followed by the air duct 12 that is configured as a sensor duct and extends up to the barometric pressure sensor 20. The typical diameter 12a of the sensor duct 12 is also approximately 1 mm (+/−20%) in a preferred configuration. The structure of the air guide 10 and the narrow diameter of the air and sensor ducts ensure reliable protection of the barometric pressure sensor 20 against penetrating water.

Another contribution to protection against penetrating water is the fact that the outer opening 6 of the air duct 11 shows a dimension or diameter 8 (which is smaller still than the diameter of the air duct 11). The diameter 8 is about 20% smaller than the typical diameter 19 of the air duct 11. An outer opening 8, that is smaller still, achieves a still better protection against penetrating water.

This allows to omit thermal measures such as heating the probe body 5. The interior remains largely free from water in operation. However, at least in the region of the probe body 5 the bicycle should not be cleaned by means of a high pressure cleaner.

Firstly, the takeup space formed in the chamber 15 would have to fill up with water before water can enter the sensor duct 12. Due to the narrow dimensions and the water's surface tension any entering water forms a plug that tightly closes the duct and thus entraps the air volume present behind in the sensor duct 12. For water to penetrate further into the sensor duct 12 the entrapped air volume must be compressed so that a counterforce acts against penetrating water. In this way, water is largely prevented from penetrating up to the barometric pressure sensor 20.

The sensors 25, 30 may be adapted or configured similarly to the illustration in FIGS. 3 to 9.

FIG. 4 shows a variant where the inner chamber 15 is subdivided into a number of chamber sections 15a, 15b etc. To this end, partition walls 15c are provided subdividing the chamber 15 in chamber sections.

The chamber sections 15a, 15b are each provided with a takeup space 17 for collecting any penetrating water 18.

The partition walls 14 of the chamber 15 are provided with connecting openings 15d which connect the chamber sections 15a, 15b etc. successively and with one another (like a strand of pearls). The connecting openings are disposed spaced apart from the bottom of the pertaining chambers or chamber sections so as to provide suitable takeup spaces. The partition walls show connecting openings disposed so that they are not aligned but disposed laterally and/or vertically offset. Preferably each of the connecting openings is disposed spaced apart from the bottom of the pertaining takeup space.

On the whole, this provides two or more interconnected chambers or chamber sections and with the pertaining air guide in-between, a labyrinth seal 14 which is a particularly reliable protection of the barometric pressure sensor 20 against penetrating water. For maintenance work or following each trip the air guide may be completely or partially cleaned. The measuring probe 4 may for example be demounted and flushed and dried and/or purged by (in particular oil-free) compressed air.

FIG. 5 shows a section of an air duct 11, 12 or 13, with a water droplet 18 exemplarily inserted in the air duct. The interior of the air ducts shows a diameter or cross section 19. The diameter 19 is in particular between 0.5 mm and 2 mm. In this specific example the clear diameter 19 is 1 mm. The outer opening 6 shows a dimension 8 which is preferably smaller than the clear diameter 19. The diameter 8 of the outer opening is preferably 0.8 mm.

The dimensions 8 and 19 are matched to one another and to the properties of water so that any penetrating water forms a water plug 18 in the interior of an air duct, as is shown in FIG. 5. The plug can enter into the duct only far enough for establishing a balance of the force generated by the compressed air volume and the force caused by the total pressure. The smaller diameters considerably contribute to sealing.

The FIGS. 6 to 9 illustrate a more concrete exemplary embodiment of the measuring probe 4 including a probe body 5. FIG. 6 shows a perspective illustration with one of the air guides 10 drawn in broken lines in the interior of the probe body 5 to provide a schematic overview. The front end shows the outwardly opening 6 at the tip of the probe body 5. The supply duct 11 follows as an air duct. In a central region, a labyrinth seal 14 is comprised following in the rear region of the sensor duct 12 as an air duct.

FIG. 7 shows a side view and FIG. 8, section A-A from FIG. 7. FIG. 7 shows two of the total of e.g. four openings 6a (alternately, three or five or six or more openings are also conceivable) on the lateral circumference of the probe body 5, through which the static pressure is absorbed. The rear end of the probe body 5 then preferably shows a differential pressure sensor which captures a differential pressure of the total pressure and the local static pressure averaged over the circumference of the probe body 5 (ambient pressure locally averaged over the circumference of the probe body). It is also possible to employ two separate barometric pressure sensors used for determining the stagnation pressure.

FIG. 8 shows the opening 6 at the front tip.

FIG. 9 shows a cross section of the probe body 5 where it can be seen that the air guide 10 extends in the interior of the probe body 5 and presently comprises two chambers 15, 16, each showing chamber sections 15*a* and 15*b*, thus a total of four chambers (chamber sections). Each of the chambers 15, 16 is approximately "H" shaped in cross section with the supply provided through the supply duct 11 at the top end of the "H". The connections with the second chamber 16 and the sensor duct 12 each also start at the top end of the chambers 15, 16. The chamber sections 15*a*, 15*b* are interconnected in a middle to top region via a connecting opening 15*d*. In this case the connecting opening 15*d* may also be referred to as an intermediate duct. The construction allows to use the lower legs of the "H"-shaped chambers 15, 16 as takeup spaces for any penetrating water 18.

The yaw sensor 30 is structured accordingly, comprising a probe body showing two openings and two air guides and preferably a differential pressure sensor 30*c* or two pressure sensors for obtaining a value of the differential pressure.

Figure 10:
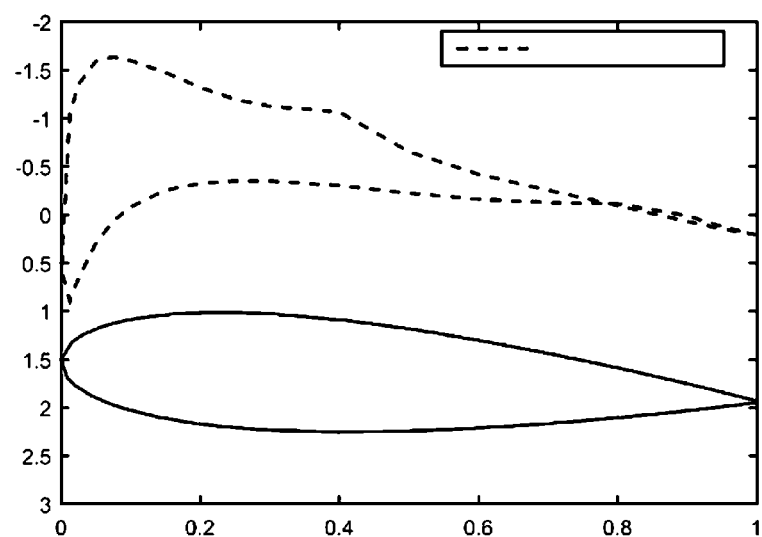
FIG. 10 an outline of the pressure coefficient on a surface of a body in the air stream.

FIG. 10 shows a diagram with the pressure distribution around the surface of an object, while air is streaming onto the object from the front. FIG. 10 shows a cross section of an aircraft wing but basically, the pressure onto a surface depends on the angle of incidence and the properties of the object in other objects as well. While this object is drawn in a solid line, broken lines show the pressure coefficient which is representative of the pressure acting locally on the surface of the object.

FIG. 10 shows what is known per se, that the local pressure onto the surface of an object is dependent on the position on the surface of the object. Thus, the local pressure may be higher or lower than the normal, inactive ambient pressure (and further also depends on the air speed).

The dependence on the position is a problem if a vehicle moving relative to the ambient air—such as a bicycle—is to capture the ambient pressure. Even the interior of an object does not show the normal ambient pressure but the pressure is influenced by the traveling speed, the wind speed, the wind direction and also by the structure of the object.

If an aerodynamic drag coefficient of a bicycle is to be obtained, the sensor values required must be captured as precisely as possible. It is a great advantage if the gradient of a path and/or also the wind direction are captured as precisely as possible.

Figure 11:
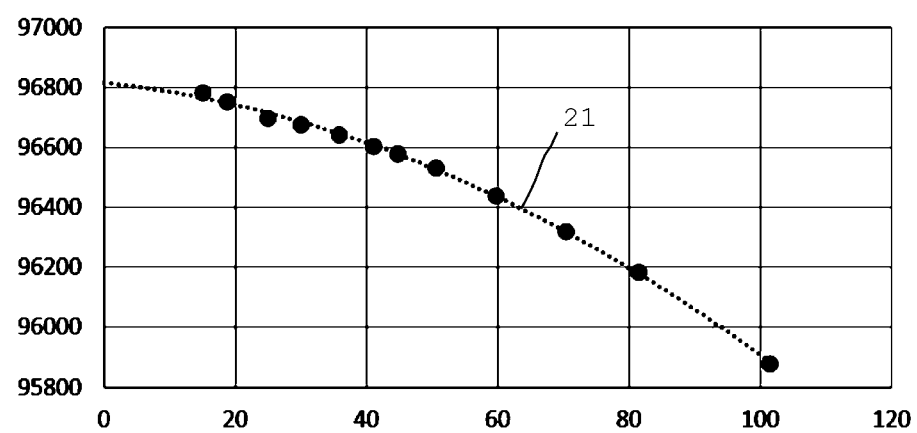
FIG. 11 an outline of the absolute ambient pressure measured with a bicycle component over the air speed relative to the bicycle.

FIG. 11 exemplarily shows the "ambient pressure" measured directly with the barometric pressure sensor 20 by means of a bicycle component 1, over the air speed respectively the speed of the bicycle relative to the wind. The pressure is plotted in Newton per square meter (N/m$^2$ or Pa) over the speed in kilometers per hour. This specific case shows that the curve of the air pressure signals 21, measured at actually the same ambient pressure, strongly depends on the relative speed. With the air speed increasing, the measured air pressure signal 21 decreases. The difference in the illustrated speed range of 0 to 100 km/h is approximately 10 mbar or 1000 Pa.

The concrete curve depends on the arrangement of the barometric pressure sensor for measuring the ambient pressure, on the precise configuration of the measuring device respectively the bicycle component 1 and also on the wind direction. The effect cannot be generally avoided, independently of a selected position. Even if, as in this case, the barometric pressure sensor 20 for the ambient pressure is disposed inside the housing 3, the relative wind blast and relative direction of the air may impair the measuring quality. Dynamic effects may show, which increase or decrease the measured value. The air may stagnate in front of the sensor inlet or Bernoulli's theorem may show a measured pressure value 21 that is lower than the true ambient pressure.

The bicycle component 1 comprises in the computer memory 51, calibration data 53 which allow, based on measurement data or empirical data, to correct the air pressure signal 21 first captured by a barometric pressure sensor 20. Using the stagnation pressure values 26 captured with the stagnation pressure sensor system 25 is most advantageous. The result may be further improved, taking into account the yaw angle 32 captured with the yaw sensor 30.

This enables considerable improvement to the determination of the current elevation of the racing bicycle 100, and the gradient or the gradient angle 201 of a path 200 can be derived at considerably improved accuracy.

Since the inclination angle or the gradient or the slope of a path considerably influences the driving power required, an aerodynamic drag coefficient can thus be determined at considerably improved accuracy. A negative gradient tends to be called slope. In a slope the aerodynamic drag coefficient also exerts a big influence.

Furthermore, the rolling resistance also influences the power required. To this end, further measurement values may be captured and analysed, or values captured previously are used. The rolling resistance is influenced by the tires used, the tire pressure, the weight of the bicycle and of the rider and the road condition, and may be obtained, computed, and/or estimated.

Data may be captured and evaluated to obtain pertaining calibration data 53 either in a wind tunnel or on suitable roads, given suitable ambient and wind conditions. The calibration data 53 may then be used in normal operation to increase the accuracy of the measurement results and the derived values. The calibration data 53 for the calibrating matrix is derived either from tests in the wind tunnel or from road tests with no variations of elevation in one range of air speeds and yaw angles.

Figure 13:
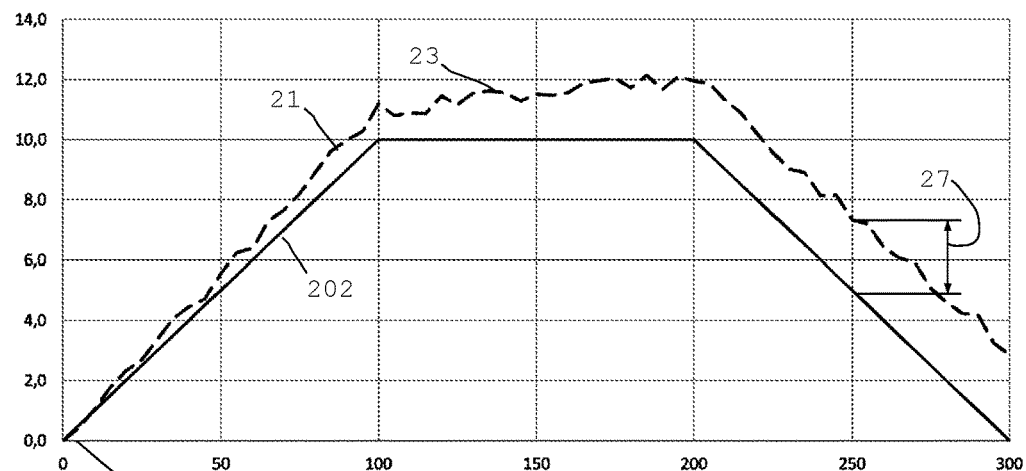
Figure 14:
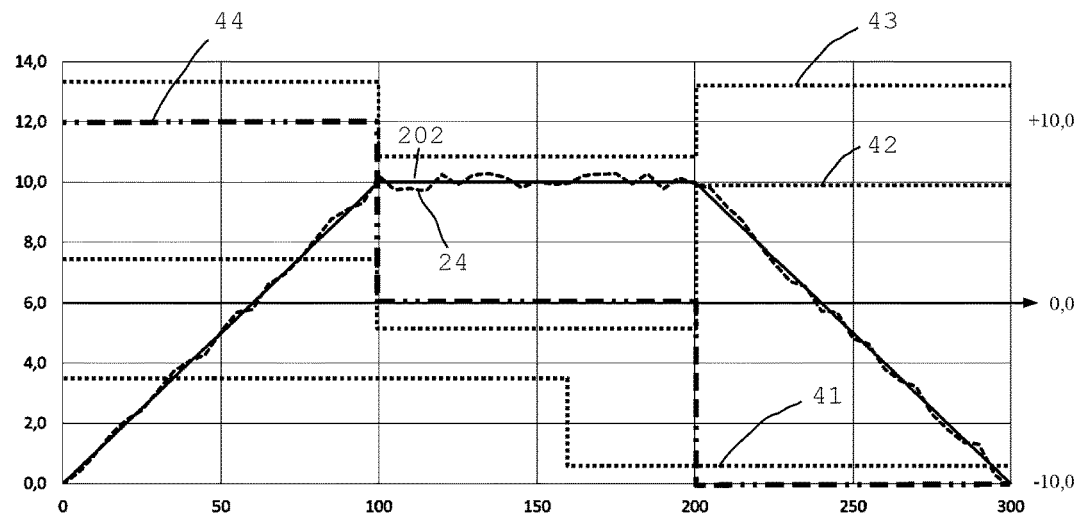

The FIGS. 12 to 14 show the elevation curve of a path 200 over the track and values measured and derived during riding on said track.

In FIG. 12, the solid line shows the actual elevation curve 202 of the path 200 in meters (relative to the starting point) over the illustrated length in meters. Cross marks indicate single measuring points obtained and recorded during the ride over the illustrated track. The inserted measurement values are elevation signals 36 obtained by a satellite sensor 35.

For this purpose, for example a GPS sensor or another satellite sensor 35 of a global navigation satellite system (GNSS) may be used. Also possible are systems using pseudosatellites providing a local satellite system and enabling triangulation of the elevation and/or position.

One can clearly see the high accuracy of the satellite sensor 35 and the elevation signals 36. One can also directly recognize that the resolution of the elevation signals 36 of the satellite sensor 35 is comparatively coarse. Elevation differences of just under 2 m are recognized. A resolution of 2 m is not sufficient for computing a gradient for determining an aerodynamic drag coefficient when operating a bicycle.

Therefore, using only satellite sensors 35 for obtaining a local gradient does not yield satisfactory results for example if an aerodynamic drag coefficient is to be computed therefrom. An interpolation between each of the measurement values does not provide the required accuracy either since the elevation curves of many paths considerably differ from the particularly simple test track shown. Thus the gradient may considerably change locally already over one meter or over a few meters.

FIG. 12 additionally shows in a broken line the curve of the measured ambient pressure during a disruptive event. These kinds of interference signals 29 may appear due to a passing vehicle and in particular a passing truck. Then the measured ambient pressure and the elevation computed therefrom considerably deviates from the true height. These events may be discounted through internal filtering. Preceding and following values are captured and taken into account and offset against the elevation determination through GPS. The typical curve with alternating pressure peaks and pressure minima facilitates filtering. Filtering also allows to prevent miscalculation of the wind direction and wind speed.

FIG. 13 shows the same track as does FIG. 12 wherein on the one hand, the actual elevation curve 202 of the test track is plotted and on the other hand, an elevation profile derived from an air pressure signal 21 of a barometric pressure sensor 20.

Initially, a reference value 28 is captured which is then used for determining an elevation difference. It can be seen that as measuring begins, the curve measured by the barometric pressure sensors shows a close match with the actual elevation curve 202. Around the middle the difference in elevation is already nearly 2 m at the value 23.

As the track continues, the elevation curve measured with the barometric pressure sensor 20 shows a systematic offset or divergence versus the actual elevation curve 202. The reason is that the barometric pressure sensor 20 does not capture the actual elevation but a measure of the ambient pressure. Although the absolute ambient pressure also depends on the elevation, it may vary e.g. due to the weather. Now if the air pressure drops during the ride on the track or if the air pressure rises, then the values so determined may diverge. This is shown exemplarily by the value 27. Again the result is that the values are not sufficiently precise for obtaining a high quality, aerodynamic drag coefficient. For this, a higher accuracy of capturing the elevation is useful.

Finally, FIG. 14 in turn shows on the one hand, the actual elevation curve 202 of the test track and on the other hand, a curve of the elevation values 24 corrected via the various sensors respectively the measurement results of the various sensors.

To this end, the air pressure signals 21 of the barometric pressure sensor 20 disposed in the interior of the housing 3 of the measuring device 2 are corrected according to the calibration data 52, by way of the stagnation pressure values 26 captured by the stagnation pressure sensor system 25 and the yaw angle values 31 captured by the yaw sensor 30, according to the basic principle of the illustration in FIG. 11, to obtain a largely correct measure of the current elevation value 24.

Moreover, in addition to capturing the air pressure signals 21, the satellite sensor 35 is also employed for determining elevation measures. At periodic intervals the high-precision satellite sensor 35 is employed to obtain a comparison value. If the elevation value 24 obtained by way of the various barometric pressure sensors 20, 25 and 30 significantly deviates from the elevation signal 36 of the satellite sensor 35, a new reference signal 28 is derived so that an accurately corrected elevation value 24 ensues with the pertaining air pressure signal 21. To avoid recalibration owing to noisy measurement values, corrections only take place if differences show over a significant period of time.

This method combines the advantages of the high accuracy of satellite sensors 35 with the advantages of the high resolution of barometric pressure sensors 21. At the same time the drawbacks of the coarse resolution of satellite sensors 35 and of the conceivable air pressure fluctuations from barometric pressure sensors 20 are avoided. As can be seen in FIG. 14, the result is high congruence of the effective curve of the elevation values 24 with the actual elevation curve 202 of the test track.

A (first) reference signal 28 may, for example be input or captured at the start of a ride or when the elevation is known. Differencing of the air pressure signal 21 during riding and the reference signal 28 allows to obtain a measure of the current elevation. The reference signal 28 may firstly be obtained by obtaining an initial air pressure signal 21 which is used as a reference signal 28 for following measurements. The pertaining reference signal 28 may also be input or captured by the satellite sensor 35. During the ride the reference signal 28 may be updated periodically and at irregular time intervals.

Corrections of the reference signal 28 used for computing a measure of elevation 23 may be carried out for example if the sum total of the deviations between the elevation signals 36 of the satellite sensor 35 and the obtained elevation values 24 exceeds a specified measure or a specified threshold over a given time period. For example, a mean value may be computed over a specific distance or after a specific time period, which is then used for comparison.

Elevation signals 36 are preferably measured between approximately 20 and 30 times per second and approximately 3 to 5 times per minute, in particular at a frequency of approximately 0.1 Hz. The frequency at which a current measure of elevation is captured from a current, characteristic air pressure signal for the ambient pressure is preferably higher and is in particular between 0.1 Hz and 1 kHz and preferably between 1 Hz and 100 Hz, particularly preferably approximately 50 Hz.

Particularly preferably, the ratio of the measuring frequency of the air pressure signal 21 for the ambient pressure to the measuring frequency of an elevation signal 36 is larger than 10 and in particular larger than 100 and preferably smaller than 5000. This allows to achieve a high measure of accuracy while energy demand remains low.

FIG. 14 additionally illustrates three curves 41, 42 and 43 of the measuring frequencies. The measuring frequency for capturing the signals and in particular capturing the elevation signals or capturing the air pressure signals is dependent on the currently prevailing riding conditions and may be adjusted by means of the control device 40 and modified as needed. Thus, the measuring frequency is set higher in particular in gradients and particularly preferably in slopes, than on straight tracks. The curves 41 to 43 each show the measuring frequency over the distance and they are shown vertically offset for better clarity, to illustrate each curve separately.

The first measuring curve 41 shows an example of a basically constant measuring frequency, where the state of the energy supply drops beneath a threshold approximately in the middle of the distance. Then, energy saving measures are initiated and the measuring frequency is clearly reduced. It is possible that at the reduced level the measuring frequency is still varied in dependence on the current riding conditions, for example it increases as the speed increases or in the case of gradients or slopes. In the plane the measuring frequency can be reduced still further.

The second measuring curve 42 shows a control variant where an increased measuring frequency is set in the region of the first gradient. As the middle plateau is reached, the measuring frequency is considerably reduced in what is now a plane level (e.g. factor 1/2). As a slope begins, the measuring frequency is greatly increased so as to achieve a very high precision for the higher riding speed downhill.

The third measuring curve 43 shows an example where in the region of the inclinations of the path (gradient/slope) the measuring frequency is increased, while the measuring frequency is reduced in the plane. This achieves increased precision in the region of the inclinations and energy demand is reduced in the plane. The curves 41 to 43 may in particular show not only the measuring frequency over the track but may also show curves of the measuring frequency over the riding time.

The schematically shown curves 41 to 43 show the measuring frequency over the track for a constant riding speed. The curves bend accordingly in the case of different riding speeds.

Preferably, the measuring curves 41 to 43 each show identical measuring frequencies at the start, at the time 0. The absolute elevation is shown at an offset to better distinguish the curves graphically.

Furthermore, FIG. 14 shows the gradient curve 44 over the measuring distance in a dash-dotted line. At the start the curve of the gradient over the first third of the measuring distance shows a constant level. The gradient shows a value (scale on the right) of +10.0. In the second third in the plane the gradient is 0.0, and in the last third there is a slope with a gradient of −10.0. A gradient value 201 may be derived through the periodically captured air pressure signals 21 and the associated track data. To this end the data are first averaged and filtered.

The known weight of the bicycle and the rider allow to derive performance data from the current gradient value and the current speed value. It is taken into account whether and how the bicycle is accelerated.

Taking into account the input performance e.g. via force sensors on the pedals or torque sensors in suitable positions, all of the data allows conclusions about the currently prevailing aerodynamic drag. This assists the rider in taking, and maintaining, an optimal position during riding, since the relevant values are periodically re-captured and displayed. Computation is in particular done at a frequency of a minimum of 5 times per minute, preferably at least 20 times per minute. Frequencies of 0.5 Hz or 1 Hz or 10 Hz or more are likewise conceivable.

On the whole, an advantageous bicycle component and an advantageous method are disclosed which enable improved options for measuring data in a bicycle. Depending on the positioning of a barometric pressure sensor for obtaining the absolute ambient pressure, the measurement result is influenced by the speed of the bicycle, the wind speed and the wind direction, and can thus provide results which are firstly imprecise. If the stagnation pressure is measured using for example barometric pressure sensors with a pitot tube open to the front in the traveling direction, a total pressure will ensue which depends on the absolutely prevailing air pressure in the ambience and on the traveling speed. This pressure signal is not alone sufficient for determining an elevation or gradient, since an impression of a gradient would show if the rider accelerates in a plane.

If the barometric pressure sensor for obtaining the absolute ambient air pressure is located for example in the housing of the bicycle component or in the measuring device 2, then the air stagnates in front of the housing as a consequence of the wind blast or the traveling speed and at the front tip of the housing generates a total pressure which negatively (or also positively) influences the absolute air pressure measured in the interior of the housing.

If the barometric pressure sensor for capturing the absolute air pressure is disposed on a side of the housing next to an opening, then the result again shows a negative influence due to Bernoulli's theorem. Then, the air flowing past may generate an underpressure which would again—depending on the speed—show a negative influence on the absolute pressure.

This is why correction of the air pressure signal 21 by the stagnation pressure value 26 is useful and advantageous if the bicycle component 1 is to obtain minor and also tiny gradients. The correction is in particular done together with a calibrating matrix captured in previous tests under known conditions. Calibration values are in particular captured and stored for variations of the relative speed and/or variations of the yaw angle. A correction is for example advantageous and important to sufficiently precisely obtain the air drag.

The correction of an elevation value 24 by means of an elevation signal 36 of a satellite sensor is advantageous since in circuits the bicycle component shows the same elevation at the end as at the beginning of the circuit.

Due to the relatively large graduation in measuring, an elevation profile is as a rule captured via barometric pressure sensors. However, known bicycle computers tend to show different elevation data at the beginning and the end of a circuit due to air pressure fluctuations. In fact, the rider has traveled a complete round and at the end of the round he is located at precisely the same elevation as he was at the beginning of the round.

The presently disclosed combination of evaluations of satellite sensors and pressure sensors allows a very precise elevation determination and in particular a very precise determination of the gradient of a path or a track. Since the power required for driving the bicycle is considerably dependent on the acceleration, the gradient if any, the rolling resistance, and the air drag, high accuracy can thus be achieved.

The invention allows the rider to also measure and evaluate during riding, his seated position as well as the bicycle components and other equipment such as his helmet, suit, clothing etc. Thus the rider may find out what for him is the optimal seated position and combination of bicycle parts and equipment and determine what for him is e.g. the best helmet in terms of aerodynamics offering the lowest air drag in his preferred position.

Other than the options described for calibrating the barometric pressure sensor during rides, re-calibration can also be performed if the barometric pressure sensor found a specific gradient or a specific slope. For example, following a gradient or a slope of 5 m or 10 m. Re-calibration can also be performed at specific time intervals. Also, a combination of calibration based on time and exceeded elevation differences may be performed.

Air pressure values are preferably measured using barometric pressure sensors showing a measuring range encompassing at least 25% and in particular at least 50% of the normal pressure of (approximately) 100 kPa. For capturing the ambient pressure or the total pressure, barometric pressure sensors are preferred showing a measuring range of higher than 30 kPa and in particular at least 50 kPa or 60 kPa or 80 kPa.

In preferred configurations the measuring range of the differential pressure sensors employed is smaller than that of the barometric pressure sensors employed. Differential pressure sensors are in particular employed for capturing the stagnation pressure and/or the yaw angles. The measuring range of a differential pressure sensor employed is preferably less than 20 kPa and in particular less than 10 kPa and particularly preferably less than 5 kPa or 2 kPa or 1 kPa. In a specific example, differential pressure sensors are used showing a measuring range of 0.5 kPa (+/−20%). This enables a high resolution and accuracy.

The measuring range of a barometric pressure sensor for capturing the ambient pressure or the total pressure is preferably larger than the measuring range of a differential pressure sensor for the stagnation pressure or for determining the yaw angle.

The ratio of the measuring range of a barometric pressure sensor for capturing the ambient pressure or the total pressure to the measuring range of a differential pressure sensor for stagnation pressure or for determining the yaw angle is preferably higher than 5:1 and in particular higher than 10:1 and particularly preferably higher than 50:1.

In all the configurations, it is preferred to perform temperature compensation of the measurement values to prevent thermal effects.

The configuration of the measuring probe respectively probe body 5 is advantageous since it allows operating a bicycle independently of the external conditions. The configuration of the air guide in the interior of the probe body 5 reliably prevents any penetrating water from being conducted toward a barometric pressure sensor. And, in case that a droplet of water or dirt has in fact entered, it is retained in the takeup space 17 of a chamber 15. Thereafter the water may exit for example by evaporation, or manual cleaning, flushing and/or purging is performed after removing the probe body 5, which is in particular clipped on. The air ducts and their dimensions and the chamber(s) provide a labyrinth seal with an additional takeup space so that the measuring probe 4 is waterproof under any conditions expected in everyday use.

A conventional membrane in the interior of the measuring probe for mechanically separating the supply duct 11 from the sensor duct 12 achieves sufficient tightness as a rule. There is the drawback that accuracy is deteriorated and the measurement results are thus deteriorated so that an aerodynamic drag coefficient cannot be determined with sufficient accuracy. The measuring probe 4 presently disclosed achieves sufficient tightness and sufficient accuracy.

Preferably, the probe body 5 is manufactured by way of 3D printing, at least partially or entirely of plastic, and/or at least partially or entirely of metal. The interior may show an integral seal or labyrinth seal. 3D printing allows much greater ease of manufacturing a probe body than conventional technology does. Thus, hollow spaces may be provided in places where solid material is otherwise required for reasons of process technology.

List of reference numerals:

| | |
|---|---|
| 1 | bicycle component |
| 2 | measuring device |
| 3 | housing |
| 4 | measuring probe |

-continued

List of reference numerals:

| | |
|---|---|
| 5 | probe body |
| 6 | opening in 5 |
| 6a | opening |
| 7 | opening |
| 8 | dimension of 5 |
| 10 | air guide |
| 11 | air duct, supply duct |
| 12 | air duct, sensor duct |
| 13 | air duct, intermediate duct |
| 14 | labyrinth seal |
| 15 | chamber |
| 15a | chamber section |
| 15b | chamber section |
| 15c | partition wall |
| 15d | connecting opening |
| 16 | chamber |
| 17 | takeup space in 15, 16 |
| 18 | water |
| 19 | cross section of 11-13 |
| 20 | barometric pressure sensor, absolute pressure transducer |
| 21 | air pressure signal of 20, sensor value of 20 |
| 22 | corrected ambient pressure value |
| 23 | measure of elevation |
| 24 | elevation value |
| 25 | stagnation pressure sensor system, pitot sensor |
| 25c | differential pressure sensor |
| 26 | stagnation pressure value, sensor value of 25 |
| 27 | change of elevation |
| 28 | reference signal |
| 29 | interference signal |
| 30 | yaw sensor system |
| 30a | opening |
| 30b | opening |
| 30c | differential pressure sensor |
| 32 | yaw angle |
| 33 | relative wind direction and wind force |
| 34 | traveling speed |
| 35 | satellite sensor |
| 36 | elevation signal |
| 37 | humidity sensor |
| 38 | acceleration sensor |
| 40 | control device |
| 41 | first measuring curve |
| 42 | second measuring curve |
| 43 | third measuring curve |
| 44 | gradient curve |
| 50 | computer |
| 51 | memory |
| 52 | data interface, network interface |
| 53 | calibration data |
| 54 | energy source |
| 100 | bicycle |
| 101 | wheel, front wheel |
| 102 | wheel, rear wheel |
| 103 | frame |
| 104 | fork, suspension fork |
| 106 | handlebar |
| 107 | saddle |
| 109 | spoke |
| 110 | rim |
| 112 | pedal crank |
| 115 | speed sensor |
| 116 | power sensor, force sensor |
| 120 | elevation |
| 200 | path |
| 201 | gradient value, gradient |

| List of reference numerals: | |
|---|---|
| | angle |
| 202 | elevation curve |
| 300 | satellite system |
| 301 | satellite |

The invention claimed is:

1. A method of capturing and evaluating sensor data while riding an at least partially muscle-powered bicycle on a path and in particular a road with at least two sensors, wherein the following steps are carried out:
   - capturing an air pressure signal on the bicycle for the ambient pressure by means of at least one barometric pressure sensor during the ride;
   - capturing a stagnation pressure value by means of at least one stagnation pressure sensor system on the bicycle during the ride; and
   - deriving a corrected ambient pressure value, taking into account the stagnation pressure value.

2. A method of capturing and evaluating sensor data while riding an at least partially muscle-powered bicycle on a path and in particular a road with at least two sensors, wherein the following steps are carried out:
   - capturing an air pressure signal on the bicycle for the ambient pressure by means of at least one barometric pressure sensor during the ride;
   - determining a measure of a relative speed of the air on the bicycle relative to the bicycle during the ride; and
   - deriving a corrected ambient pressure value, taking into account the relative speed.

3. The method according to claim 2, wherein a stagnation pressure value is obtained by means of at least one stagnation pressure sensor system, to determine a measure of the relative air speed.

4. The method according to claim 1, wherein an aerodynamic yaw angle value is captured by way of at least one yaw sensor system.

5. The method according to claim 4, wherein a corrected ambient pressure value is derived, taking into account the aerodynamic yaw angle value.

6. The method according to claim 1, wherein a corrected ambient pressure value is derived periodically.

7. The method according to claim 1, wherein the corrected ambient pressure value is also derived during riding.

8. The method according to claim 1, wherein the traveling speed of the bicycle is obtained and taken into account.

9. The method according to claim 1, wherein a gradient angle is obtained and taken into account.

10. The method according to claim 1, wherein the relative wind direction and/or wind speed is/are obtained and taken into account.

11. The method according to claim 1, wherein furthermore the following steps are carried out:
    - deriving a current measure of elevation from the current air pressure signal for the ambient pressure;
    - deriving at least one current elevation signal by capturing data from a satellite system; and
    - computing a current elevation value from the current air pressure signal, taking into account the current elevation signal.

12. The method according to claim 11, wherein a change of elevation is derived from the current air pressure signal and a reference signal of the air pressure.

13. The method according to claim 12, wherein a reference signal is corrected when the obtained current elevation value differs from the current elevation signal by a specific measure.

14. The method according to claim 1, wherein at least one aerodynamic drag coefficient is derived.

15. A bicycle component for an at least partially muscle-powered bicycle, comprising: at least one barometric pressure sensor for capturing at least one air pressure signal for an ambient pressure during the ride, at least one stagnation pressure sensor system for determining at least one stagnation pressure value during the ride, and/or a sensor system for determining a measure of a relative air speed during the ride, and a computer, which is configured and set up to derive from the air pressure signal, a corrected ambient pressure value for the ambient pressure, taking into account the obtained stagnation pressure value and/or taking into account the relative air speed during the ride.

16. The bicycle component according to claim 15, comprising at least one yaw sensor system for capturing at least one aerodynamic yaw angle value.

17. The bicycle component according to claim 16, wherein the computer configured and set up to compute a corrected ambient pressure value, taking into account the aerodynamic yaw angle value.

18. The bicycle component (1) according to claim 15, wherein at least one sensor system includes at least two different surfaces oriented at angles relative to one another, and where pressure sensors measure the air pressure.

19. The bicycle component according to claim 15, wherein at least one sensor system comprises a differential pressure sensor.

20. The bicycle component according to claim 15, comprising a handlebar to which at least one of the sensors is directionally fastened, and/or wherein at least one of the sensors is fixedly connected with the frame.

21. The bicycle component according to claim 15, comprising a frame, a fork, at least one front wheel and at least one rear wheel.

22. The bicycle component according to claim 15, wherein at least one speed sensor for capturing the traveling speed is comprised and/or at least one power sensor is comprised.

23. The bicycle component according to claim 15, wherein a memory device is comprised for storing the captured measurement values and/or at least the corrected ambient pressure values and/or calibration data, and/or wherein at least one data interface for transmitting data is comprised.

24. The bicycle component according to claim 15, wherein at least one satellite sensor for capturing a current elevation signal is comprised.

25. The bicycle component according to claim 15, wherein at least one humidity and/or temperature sensor is comprised.

* * * * *